3,046,233
TREATMENT OF AQUEOUS SOLUTIONS
Eli Levy, Cleveland Heights, Ohio, assignor, by mesne assignments, to Midland-Ross Corporation, Cleveland, Ohio, a corporation of Ohio
No Drawing. Filed Dec. 17, 1957, Ser. No. 703,288
14 Claims. (Cl. 252—193)

This invention relates to the treatment of aqueous solutions containing oleaginous materials. More particularly this invention relates to a process for treating used aqueous viscose rayon treating solutions containing organic oils such as oleaginous viscose spinning additives, viscose solution additives, lubricants, and the like thereby leaving such solutions more readily treatable by standard recovery processes.

In many processes it is desirable to recover and regenerate the treating solutions used therein. Process treating solutions usually contain one or more valuable components some of which may not be completely exhausted in the course of the process. In many instances, the recoverability of these components is essential if it is to be practical to utilize the process. For example, it is common practice in the viscose process to recover, regenerate and reuse the coagulating and regenerating bath into which the viscose solution is extruded and formed into filaments, fibers and/or films. Viscose coagulating and regenerating baths usually contain such valuable components as sulfuric acid, sodium sulfate and salts of heavy metals such as zinc, magnesium, iron and the like which are not completely exhausted in the process and are readily reuseable. Similarly, many of the treating solutions applied to the formed regenerated cellulose contain these same or similar materials, albeit in lesser concentrations, which are susceptible to recovery and reuse. In the recovery of these materials the solutions are subjected to such process treatments as evaporation, filtration, crystallization and the like. Such additional treatments as flotation, settling, ion-exchange, distillation, and the like are used in the recovery of process solutions which find widespread application in other industries including electro-plating, paper manufacture, metal treating, water treatment and the like.

The presence of oleaginous or oily materials in aqueous treating solutions whether present as contaminants or as essential elements of the solution, however, render the handling of the solution through the equipment of these recovery processes very difficult and, in some instances, even prevents the proper recovery and reuse of the solution. In process equipment, such as evaporation, distillation or heat exchange equipment, oleaginous materials tend to cling to the equipment surfaces and reduce the heat transfer coefficient of the unit. Oil-containing solutions when processed through filtration equipment tend to coat the filter media with the oily component which adheres tenaciously and reduces the filtering capacity of the equipment. Similarly, in ion-exchange processes, the oleaginous materials tend to coat the resins and prevent their being effectively brought into contact with the ionized solution. In some cases, the oleaginous material even combines with the resins altering their character and resulting in the loss of their ion-exchange properties.

Recently in the viscose process, it has been found desirable to add small amounts of oleaginious materials as viscose spinning additives either to the viscose or the coagulating and regenerating bath or both for various reasons such as to increase the ratio of skin-to-core area of the yarn cross section, improvement of the strength of the finished product, prevention of incrustations on the spinning nozzle, retardation of the regenerative effect of the bath and the like. Necessarily a certain amount of this oleaginous material clings to the yarn and is carried over into the aftertreating solutions resulting in not only the coagulating and regenerating bath solution containing oleaginous materials but also the aftertreating solutions. The regenerative treatment accorded these solutions before they can be reused are thus rendered more difficult than had heretofore been the case.

In order to overcome these difficulties a number of processes have been proposed directed toward separating the oleaginous material from the aqueous solution prior to the recovery treatment. One such process suggests passing the aqueous solution through a bed of activated carbon to adsorb the oleaginous constituents. Periodically, when the activated carbon has reached its adsorptive capacity, the treatment of the aqueous solution is discontinued and the activated carbon is regenerated for reuse. However, with each successive regeneration, due to the tenacity with which the oily components cling to the carbon particles, the adsorptive capacity of the activated carbon decreases and rapidly approaches a point where it is no longer sufficient to make the further utilization of activated carbon practicable. The regeneration and reuse of the activated carbon is necessitated by its relatively high cost which limits its utility to processes wherein it can be regenerated many times. In some cases the adsorptive attraction between the oleaginous material and the carbon particles is so strong that regeneration is very difficult requiring special techniques and considerable time to effect a complete removal of the adsorbed material. Furthermore, activated carbon is not effective in removing all oleaginous materials and with many of such materials which it does adsorb, its adsorptive capacity is of a low order. As a result in some cases the total capacity of this means of treatment is too low to be practically utilizable.

Another process frequently suggested for the separation of oleaginous material from an aqueous solution is decantation or settling. This process is applicable only to systems in which the solution and the oleaginous material are completely immiscible or can be readily rendered into two distinct phases. Generally, decantation is carried out by introducing the solution into a large vessel where it is maintained tranquil to allow the two phases to separate. The heavier aqueous phase is then drawn off and the oleaginous phase that remains is discarded. The speed with which this process may be carried out depends upon the propensity of the liquids to separate and is usually very slow. Also, the separation vessel must be quite large in order to insure that the solution will be maintained tranquil. Finally, the drawing off of the lower layer cannot be done precisely without some of the solution being left with the layer that is to be discarded. This results in this process always entailing the loss of part of the solution it is designed to recover.

The present invention now provides a separation process capable of effecting a substantially complete removal of oleaginous materials from aqueous solutions quickly and by means of rather simple equipment. Furthermore, the media used in making the separation is inexpensive and thus need not be regenerated but may be readily discarded.

In accordance with this invention a relatively small amount of an aqueous dispersion of hydrated colloidal clay is added to the aqueous solution which contains oleaginous material. The mixture is blended in the presence of a small amount of a cation active material resulting in the colloidal clay coagulating into flocs. The flocculated oil-clay complex is then separated from the aqueous solution leaving the aqueous solution substantially free from the oleaginous material and readily treatable by standard recovery processes.

In the practice of this invention particular advantages have been found in its utilization on acidic aqueous solutions which contain relatively small amounts of oleaginous materials such as, for example, used aqueous viscose treating solutions including both spin bath solutions and more particularly aftertreating solutions which contain expensive and recoverable salts. A relatively small amount of an aqueous dispersion of colloidal clay such as bentonite is added to the acidic aqueous solution and mixed in the presence of a cation active material an example of which is the cation active quaternary ammonium compound, lauryl pyridinum chloride. The clay and the oleaginous material form a complex and in the presence of the cation active material agglomerate into flocs which may be readily separated from the solution by such means as filtration, flotation and the like. The solution is substantially completely free of oleaginous material although its inorganic constituents are not affected and it can be treated by one or more standard recovery processes such as crystallization to reclaim part of the salts in the solution, evaporation to concentrate the solution, ion-exchange to recover the expensive salts that are present in small concentrations and the like.

The term colloidal clay as used herein is meant to include the naturally occurring clay minerals which when hydrated in water form homogeneous colloidal dispersions. Clays of this nature are well-known being found in abundance in this country. Usually these clays are complexes of aluminum oxide-silica-water of varying proportions which give rise to slight variations in adsorptive capacity, stability of their sol, and the like. Altogether there appears to be seven clay materials which exhibit some degree of aqueous colloidal characteristics but particular advantages have been found from using a clay selected from the group consisting of kaolinite, beidellite and montmorillonite. Although these clays vary but slightly in their composition their characteristics show definite distinctions and it has been found more advantageous to utilize montmorillonite in this separation process. The principal naturally occurring montmorillonite clay is bentonite which is widely used in the formation of emulsions. It is surprising then to find that these materials are effective agents in a process which, among other things, breaks emulsions. In this process bentonite is the preferred colloidal clay and the invention will be further described with respect to it although it is not intended thereby to restrict the invention thereto since other colloidal clays may be utilized in this process.

In the preparation of the aqueous dispersion of the bentonite sufficient time must be allowed for the clay to become completely hydrated or a homogeneous dispersion cannot be formed. Complete hydration depends upon such variables as the rate of diffusion through the clay and the adsorptions by the clay of the water. These variables are significantly affected by the physical form of the clay such that finely ground clay takes considerable time to become wetted and fully hydrated. Clay in granular form on the other hand such as, for example, American Colloid Company's "No. 90 Volclay" whose particle size averages about 90 mesh readily adsorbs water and hydrates in a fraction of the time that powdered clay requires. Although it is preferred to use a granular clay, that is, a clay whose particle sizes vary between about 10 and 100 mesh, powdered clay which ranges up to about 325 mesh may also be used since the particle size does not affect the adsorptive ability but merely determines the speed of hydration and dispersion. In preparing the aqueous clay dispersion the clay is always introduced into the water which must be substantially free of electrolytes in order that a homogeneous sol can be formed. If powdered clay is used it must be afforded considerable time to hydrate and disperse in the water before it is agitated whereas granular clay hydrates and disperses almost instantly and may be mixed immediately to form a uniform sol.

The rate of hydration of bentonite is also influenced by the concentration of clay sought to be suspended. By the use of special techniques dispersions of as high as 20% by weight of bentonite can be prepared but it has been found that when the concentration of bentonite exceeds about 10% by weight the rate of hydration becomes very low and the resulting dispersion is so viscous that it is difficult to handle through ordinary pumps and pipe lines. Consequently, it has been found advantageous to use a dispersion of less than about 10% and further it has been found that even greater advantages are derived from using a dispersion of about 6% by weight or less of colloidal bentonite.

Oleaginous or ether extractable materials found in aqueous treating solutions used in manufacturing processes are broadly classified by their origin as mineral, vegetable, animal or synthetic. Surprisingly it has been found that this process is capable of removing oily materials originating from all of these sources. While it is not our intention to predicate this invention on a theory as to the novel results achieved, the adsorptive attraction between the oleaginous material and the bentonite could be due to the similar charge of the two materials; i.e., oleaginous materials regardless of origin are anionic as is bentonite. The charges on these particles are both much stronger than the charges on inorganic material and are mutually repellent until neutralized by the addition of a cation active material. The addition of a cation active material sufficiently strong enough to neutralize these charges results in joining together the oleaginous material and the bentonite by means of the cation active material. This theory is in complete accord with the fact that the oleaginous material is not substantially removed by the bentonite until the bentonite sol is agglomerated since it is not until the agglomerating step that the bentonite and oil are joined except for some incidental occlusion. It has been found that regardless of the physical state of the oleaginous materials in the aqueous solution this process is equally effective in removing the oleaginous adulterant. Although this process finds its greatest utility with partially soluble or dispersed insoluble oils, it is also useful in removing soluble oils; a characteristic of the process which lends credence to the above theory. Similarly, systems containing two or more oils from totally different origins and in various physical states present no special problems in carrying out this process. Of particular noteworthiness in further support of this theory is the fact that the treatment of an aqueous solution containing dissolved salts, acids or bases does not affect the content or form of these constituents but leaves them substantially as they were in the original solution and readily treatable by standard recovery processes.

The amount of clay necessary for the complete removal of the oleaginous material from an aqueous solution varies in accordance with such factors as the chemical composition of the oleaginous material, the physical characteristic of the oleaginous material, the nature of the colloidal clay sol and the like. Generally, it has been found that when the bentonite and the aqueous solution are thoroughly mixed a ratio by weight of bentonite to oil of no more than about 3 to 1 is ample to effect a complete separation. Particular advantages, however, have been obtained in using ratios of as low as 1 to 1 to effect a complete clarification.

In order to effect a complete clarification of the solution it has been found that the bentonite-oil complex must be flocculated before separation. It has been found that the agglomeration of the colloidal clay particles can be readily effected by neutralization of the well-known anionic activity which the colloidal clays, and particularly bentonite, display when dispersed in an aqueous solution. It is well-known that inorganic electrolytes such as strong acids, strong bases, and sulfate, chloride, and nitrate salts will coagulate bentonite sols. The amount of such solutions which are required, however, to produce complete flocculation are quite large and the inorganic ions introduced in this way are not always desirable since they remain in the clarified solution. It has been found that greater advantages accrue from the use of organic cation active materials which need be used in relatively small amounts and are not retained in the aqueous solution but are separated with the bentonite-oil complex. The presence of a cation active material appears to neutralize the anionic charge on the clay particles causing them to lose their colloidal force and to flocculate carrying the adsorbed oleaginous material with the flocs. The cation active material may be added after the bentonite dispersion has been thoroughly mixed with the aqueous solution or it may already be present in the aqueous solution when the dispersion is added without any deleterious effects upon the completeness of the clarification resulting. The use of cation active materials in aqueous solutions has been taught in the viscose rayon art for such purposes as preventing extrusion nozzle incrustation, promoting spin bath clarity and the like but the amounts suggested would not be sufficient to produce the necessary agglomeration of the bentonite as more specifically described below.

By cation active material it is meant surface active materials which carry in the cation the group or radical which is responsible for the surface activity. Any cation active material is effective in bringing about flocculation but it has been found more advantageous to use a cation active material selected from the group consisting of surface-active quaternary ammonium, phosphonium, sulphonium and oxonium compounds. In the carrying out of this process, however, particular advantages have been found from using surface-active quaternary ammonium compounds; that is, compounds having a pentavalent nitrogen atom to which is attached a long chain aliphatic or aromatic group imparting surface activity and an innocuous anion. This group of compounds includes lauryl pyridinium chloride whose use displays particular advantages.

The proportion of cation material which is necessary to produce complete flocculation depends generally upon the type of colloidal clay and the type of cation active material used. More specifically, the amount of cation active material required is related to the strength of the charge on the clay and the degree of activity of the cation active material. It has been found that in order to completely flocculate a dispersion of bentonite made up by using American Colloid Company's "No. 90 Volclay," about one part of lauryl pyridinium chloride is required for every 26 parts of bentonite by weight. When other colloidal clays are used which exhibit a greater or lesser charge on the particles than bentonite, correspondingly greater or lesser quantities of lauryl pyridinium chloride are required. Similarly, when other cation active materials are used, the amounts required must be adjusted in accordance with their relative cation activity. Generally, however, it has been found that no more than about one part by weight of cation active material is needed for every five parts by weight of colloidal clay.

Separation of the flocculated clay from the solution may be carried out by any of the commonly employed means of separating solids from liquids. The solution may be filtered, for example, on a conventional plate and frame filter press or through a filter bed of sand or coal. It has been found that after the bentonite has been agglomerated that there is no difficulty in filtering out the fine particles of the complex which are effectively occluded within the easily filtered flocs. Filtration through a bed of sand or coal is particularly well suited for this process in that the filter bed may be periodically easily back-washed and the flocculant material discarded. By reason of the fact that this process results in a distinct separation of the liquid from solid which solid flocs are quite buoyant, it has been found that particular advantages are gained by using flotation methods in separating the flocs. Flotation separation of these materials is carried out by introducing air into the bottom of the process vessel through, for example, a sparging pipe or porous carbon tube, the air floats the flocculent bentonite-oil complex to the top of the solution where it may be carried over the side of the vessel into a trough. Alternatively, the separation may be completed by drawing off the clarified liquid from beneath the layer of floc.

A particularly good example of the utility of this process is afforded by the viscose rayon process which although we do not wish to limit this invention to a particular process since its application is much broader in scope we will use in some of the following examples to further explain the invention. In these examples, parts and percent of materials are intended to mean parts and percent by weight.

*Example I*

A 6% colloidal bentonite dispersion is made up by slowly adding 5.4 parts of a 325 mesh domestic bentonite powder to 84.6 parts of water. The mixture is allowed to stand without agitation for at least 24 hours until the bentonite becomes fully hydrated after which it is vigorously stirred, producing a smooth, viscous stable colloidal dispersion, free from lumps.

11 parts of this 6% bentonite dispersion are then added to 1200 parts of an aqueous viscose rayon treating solution containing about 0.3% sulfuric acid, 0.5% zinc sulfate, 0.9% sodium sulfate, and about 0.07% of dispersed ether extractable oleaginous materials. The ether extractable oleaginous materials consist primarily of ammoniated fish oils and a small amount of mineral oils. The mixture is thoroughly mixed dispersing the bentonite easily throughout the solution and thus obtaining intimate contact between the bentonite particles and the oleaginous material contained in the solution.

To this mixture is added 0.45 parts of a 5% aqueous solution of lauryl pyridinium chloride with agitation. Upon the addition of this cation active material to the mixture the bentonite-oleaginous complex immediately flocculates and remains suspended in the solution as large agglomerated masses.

The solution is then passed through a coal bed filter filled in equal proportions with five grades of anthracite coal with a layer of the largest particle size (9/16" x 13/16") on the bottom and having in order above that layers having particle sizes of 5/16" x 9/16", 3/16" x 5/16", 3/32" x 3/16", and 0.60–0.80 mm., such as that marketed by Anthracite Equipment Corporation as their "Anthrafilt" filter media grades #1, 2, 3, 4 and 5 with grade #5 being the coarsest. The solution issuing from the filter is perfectly clear and when tested contains substantially no ether extractable material. The other components of the original aqueous solution are present in the same proportions as they appeared in the solution before treatment.

The clarified aqueous solution is then introduced into a column containing 1 cubic ft. of a sulfonated copolymer of styrene and divinylbenzene marketed by Dow Chemical Company as their cation exchange resin trade named Dowex 50–X–12. The flow rate of the solution is maintained at 50 parts per sq. ft. of resin surface per minute and the effluent which contains substantially no zinc sulfate is discarded. After all of the aqueous solution has been thus treated and the column drained, the resin bed is back-washed with 200 parts of a 20% aqueous-sulfuric acid solution to recover the zinc in a 2.8% zinc sulfate solution. This solution is then readily useable in making up an aqueous viscose rayon treating solution by the proper addition of the other required constituents or it may be used to increase the zinc sulfate content of unused aqueous treating solutions.

*Example II*

8.82 parts of a 5.4% aqueous colloidal bentonite dispersion made up as described in Example I is added to 1000 parts of an aqueous viscose rayon treating solution containing about 2.5% sulfuric acid, 3% sodium sulfate, 0.35% zinc sulfate, 0.4% ether extractable oleaginous material, and 20 p.p.m. of lauryl pyridinium chloride. The mixture is thoroughly mixed by introducing air into the bottom of the mixing vessels through porous carbon tubes. The aeration is carried out in two stages comprising first a vigorous addition resulting in entraining considerable air in the flocs followed by a more gentle flotation separation stage. The gentle aeration stage carries the bentonite flocs to the surface of the solution in a flocculent layer where they are flushed over the top and removed in the manner commonly used in the flotation art. The residual solution is free of both bentonite and ether extractable oleaginous material and readily treatable to recover the constituents thereof by one or more standard recovery processes including crystallization, evaporation, ion-exchange and the like.

*Example III*

A 4% colloidal bentonite dispersion is made by adding with mixing 3.6 parts of American Colloid Company's "No. 90 Volclay" to 90 parts of water. The granular Volclay immediately disperses in the water and within an hour is hydrated and may be agitated to produce a smooth, homogeneous dispersion or sol.

12 parts of this aqueous bentonite dispersion are added to 1000 parts of a viscose rayon treating solution of the same composition as that described in Example I. The mixture is agitated as before but this time no cation active material is added. The dispersion mixes uniformly in the treating solution affording the clay particles an opportunity for contacting all of the oleaginous material contained therein yet maintaining its colloidal character.

The mixture is then passed through the "Anthrafilt" filter described in Example I and collected. The collected solution is very cloudy containing the colloidal bentonite which was not removed by the filter. The solution under these conditions retains a substantial amount of the oleaginous material and is not suitable for further processing by ordinarily acceptable means in order to recover the other salts.

*Example IV*

194 parts of a 4% colloidal bentonite dispersion prepared as described in Example III are added to 950 parts of an aqueous solution containing 1.2% of a commercial grade coconut oil. The mixture is stirred briefly to effect thorough mixing and 6 parts of a 20% aqueous solution of cetyl dimethyl ethyl ammonium bromide such as General Dyestuff Corporation's "Bionol EC" or Fine Organic Company's "Bretol" or Rhodes Chemical Company's "Ethyl Cetab" is added. The bentonite dispersion immediately begins to flocculate and upon the introduction of air as in Example II the floc rises to the surface and is separated from the solution. The remaining solution is perfectly clear and contains no determinable ether extractable oleaginous material.

Aqueous solutions which may advantageously be treated by this process include aqueous mediums having a wide range of concentrations and types of materials contained therein but particular advantages have been found in utilizing this process on aqueous solutions having relatively small amounts of substantially completely dissolved inorganic components such as, for example, inorganic salts, acids, bases, or the like. Solutions which can be treated by this method may contain one or more of the inorganic components substantially completely dissolved therein any one or more of which it is desired to subsequently recover. Also, it is readily understood that this process is applicable to aqueous solutions having widely varying contents of oleaginous material since, as discussed above, the amount of oleaginous material which can be removed depends upon the amount of clay employed. Sometimes, however, due to the practical concentrations of the clay dispersions which may be used, solutions having a high content of oleaginous material may be diluted beyond the point where subsequent recovery treatments are practical. For this reason, among others, it has been found that this process is more advantageously used on solutions containing relatively small amounts of oleaginous material and is particularly advantageously applied to solutions which contain no more than about 3% by weight of oily constituents.

Aqueous solutions of the above description are found in the viscose rayon art in both the pot spinning and continuous process methods of producing rayon wherein they are used as viscose treating solutions. Viscose treating solutions are characterized by their use as either spin bath solutions or aftertreating solutions. The viscose is extruded into the spin bath solution which is composed of from 4 to 12% sulfuric acid; 5 to 25% sodium sulfate; 1 to 15% zinc, magnesium, or iron sulfate; and relatively small amounts of oleaginous materials. Aftertreating solutions wash the coagulated product after it has been partially regenerated by the spin bath and complete the regeneration and wash the occluded impurities out of the finished product. These solutions are usually somewhat more dilute than spin bath containing about 0.1 to 3% sulfuric acid; 0.5 to 5% sodium sulfate, 0.05 to 1% zinc, magnesium, or iron sulfate, and relatively small amounts of oleaginous material. Some of these constituents, particularly the zinc sulfate, are quite expensive and appear in approximately these concentrations in the used solution after being employed in the process. It is, therefore, desirable to recover these materials but this, heretofore, has been hindered by the small amounts of oleaginous materials contained therein.

Although the preferred embodiment of this process involves the addition of the cation active material to the aqueous solution after the addition of the colloidal clay, the presence of the cation active material in the solution at the time the colloidal clay is added does not materially alter the result. Apparently the neutralization of the charge on the colloidal clay by the cation active material proceeds at the interface of the dispersion and the solution where the joining of the oleaginous material occurs as the clay disperses in the solution and before it is completely flocculated. Either manner of carrying out the process results in the removal of the oleaginous material leaving the concentration of the remaining constituents unaltered.

Standard recovery processes utilized on treating solutions such as viscose treating solutions include crystallization, evaporation, filtration, ion-exchange and the like. For example, it is common practice in the viscose rayon art to regenerate and reuse the spin bath by treating it in a series of processes which include filtering the insoluble impurities out of the solution, evaporating part of the water to increase the concentration of the acid, and crystallizing and reclaiming excess sodium sulfate resulting from the neutralization of the viscose. The more dilute aftertreating solutions are sometimes also treated with an ion-exchange resin to recover the zinc sulfate in the manner illustrated in Example I above. The presence of oleaginous materials in the solutions being treated renders these processes more difficult if not impossible to perform; particularly the ion-exchange process wherein the oleaginous materials will sometimes react with the exchange resin causing it to lose its ion-exchange properties or at least coat the resin particles and prevent them from contacting the solution being treated. Now these problems may be overcome by substantially completely removing the oleaginous materials from the aqueous solutions thereby rendering it readily treatable by these standard recovery processes.

Since certain changes in the practice of this invention may be readily made without substantially departing from its spirit or scope, it is to be understood that all the foregoing be interpreted as being merely illustrative and is not to be construed as limiting or restricting the

What is claimed is:

1. A process for treating an aqueous solution containing oleaginous material the steps comprising; adding a relatively small amount of an aqueous dispersion of colloidal clay to said aqueous solution; thoroughly mixing said dispersion and said aqueous solution in the presence of a relatively small amount of cation active material; and separating out the resultant agglomerated clay-oleaginous material complex from said aqueous solution thereby leaving said aqueous solution substantially free of said oleaginous material and readily treatable by standard recovery processes.

2. A process for treating an aqueous solution containing a relatively small amount of oleaginous material the steps comprising; adding a relatively small amount of an aqueous dispersion of bentonite to said aqueous solution; thoroughly mixing said dispersion and said aqueous solution in the presence of a relatively small amount of cation active material; and separating out the resulting agglomerated bentonite-oleaginous material complex from said aqueous solution thereby leaving said aqueous solution substantially free of said oleaginous material and readily treatable by standard recovery processes.

3. A process in accordance with claim 2 in which the amount of bentonite employed is no more than about 3 parts by weight for every 1 part by weight of oleaginous material.

4. The process in accordance with claim 2 in which the amount of cation active material present is no more than about 1 part by weight for every 5 parts by weight of bentonite.

5. A process for treating an aqueous acidic solution containing no more than about 3% by weight of oleaginous material the steps comprising; adding a relatively small amount of an aqueous dispersion of bentonite to said aqueous solution; thoroughly mixing said dispersion and said aqueous solution in the presence of a relatively small amount of cation active material; and separating out the resultant agglomerated bentonite-oleaginous material complex from said aqueous solution thereby leaving said aqueous solution substantially free of said oleaginous material and readily treatable by standard recovery processes.

6. A process for treating a used gaseous viscose treating solution containing relatively small amounts of oleaginous viscose spinning additives the steps comprising; adding a relatively small amount of an aqueous dispersion of hydrated bentonite to said used aqueous solution; thoroughly mixing said dispersion and said used aqueous solution in the presence of a relatively small amount of cation active material; and separating the resultant agglomerated bentonite-oleaginous material complex from said used aqueous solution thereby leaving said used aqueous solution substantially free of said oleaginous additives and readily treatable by standard recovery processes.

7. A process in accordance with claim 5 in which the cation active material is selected from the group consisting of quaternary ammonium, phosphonium, sulphonium and oxonium compounds.

8. A process in accordance with claim 5 in which the aqueous dispersion of hydrated bentonite contains no more than about 10% by weight of bentonite.

9. A process for treating a used aqueous viscose treating solution containing relatively small amounts of oleaginous viscose spinning additives the steps comprising; adding a relatively small amount of an aqueous dispersion of hydrated bentonite to said used aqueous solution; adding a relatively small amount of cation active material to the mixture of said dispersion and said aqueous solution; and separating the resultant agglomerated bentonite-oleaginous material complex from said aqueous solution thereby leaving said aqueous solution substantially free of said spinning additives and readily treatable by an ion exchange process.

10. A process in accordance with claim 9 in which the agglomerated bentonite-oleaginous material complex is separated from the aqueous viscose treating solution by filtration.

11. A process in accordance with claim 9 in which the agglomerated bentonite-oleaginous material complex is separated from the aqueous viscose treating solution by flotation.

12. A process for treating used aqueous viscose treating solution containing no more than about 3% oleaginous viscose spinning additives the steps comprising; adding an aqueous dispersion of no more than about 6% by weight of bentonite to said used aqueous solution in a proportion of at least about 3 parts by weight of bentonite for every 1 part by weight of said oleaginous additives; thoroughly mixing said dispersion and said used aqueous solution in the presence of at least 1 part by weight of a cation active quaternary ammonium compound for every 26 parts by weight of bentonite; and separating the resultant agglomerated bentonite-oleaginous additives complex from said used aqueous solution thereby leaving said used aqueous solution substantially free of said oleaginous additives and readily treatable by standard recovery processes.

13. A process for treating a used aqueous viscose treating solution containing no more than about 3% by weight of oleaginous viscose spinning additives the steps comprising; adding an aqueous dispersion of no more than about 6% by weight of bentonite to said used aqueous solution in a proportion of at least 3 parts by weight of bentonite for every 1 part by weight of oleaginous additives; thoroughly mixing said dispersion and said used aqueous solution in the presence of at least 1 part by weight of a cation active quaternary ammonium compound for every 26 parts by weight of bentonite; separating the resultant agglomerated bentonite-oleaginous additives complex from said used aqueous solution thereby leaving said used aqueous solution substantially free of said oleaginous additives; contacting said used aqueous solution with a cation exchange resin to adsorb the zinc ions from said aqueous solution; discontinuing the contacting of said used aqueous solution and said resin; contacting said resin with a 20% sulfuric acid-aqueous solution to regenerate said resin and recover the zinc in the form of zinc sulfate; and adding said zinc sulfate to an unused aqueous viscose treating solution.

14. A process for treating a used aqueous viscose treating solution containing no more than about 3% by weight of oleaginous viscose spinning additives the steps comprising; adding an aqueous dispersion of no more than about 6% by weight of bentonite to said used aqueous solution in a proportion of at least 3 parts by weight of bentonite for every 1 part by weight of oleaginous additives; thoroughly mixing said dispersion and said used aqueous solution in the presence of at least 1 part by weight of a cation active quaternary ammonium compound for every 26 parts by weight of bentonite; separating the resultant agglomerated bentonite-oleaginous additives complex from said used aqueous solution thereby leaving said used aqueous solution substantially free of said oleaginous additives; subjecting at least a portion of said used aqueous solution to evaporation thereby concentrating its acid content; and adding said concentrated aqueous solution to an unused aqueous viscose treating solution.

References Cited in the file of this patent
UNITED STATES PATENTS

| | | |
|---|---|---|
| 1,170,868 | Bechler | Feb. 8, 1916 |
| 1,472,385 | Brown | Oct. 30, 1923 |

(Other references on following page)

UNITED STATES PATENTS

| | | |
|---|---|---|
| 1,953,868 | Richter et al. | Apr. 3, 1934 |
| 2,236,930 | Uytenbogaart | Apr. 1, 1941 |
| 2,242,225 | Bley | May 20, 1941 |
| 2,242,226 | Bley | May 20, 1941 |
| 2,336,778 | Costa et al. | Dec. 14, 1943 |
| 2,345,827 | Olin | Apr. 4, 1944 |
| 2,352,519 | Costa et al. | June 27, 1944 |
| 2,531,427 | Hauser | Nov. 28, 1950 |
| 2,795,545 | Gluesenkamp | June 11, 1957 |
| 2,860,987 | Werner | Nov. 18, 1958 |
| 2,862,880 | Clemens | Dec. 2, 1958 |

OTHER REFERENCES

Davis et al.: Bentonite—Bureau of Mines Technical Paper No. 438, 1928, page 48.

Chemical Engineering, June 1956, page 148.